United States Patent
Heidel et al.

(10) Patent No.: US 8,473,942 B2
(45) Date of Patent: Jun. 25, 2013

(54) CHANGABLE DEPLOYMENT CONDITIONS

(75) Inventors: Stephan Heidel, Sinsheim (DE); Martin Mayer, Heidelberg (DE); Juergen Quentel, Kronau (DE); Dirk Rosenkranz, Berlin (DE)

(73) Assignee: SAP AG, Walldorf (DE)

( * ) Notice: Subject to any disclaimer, the term of this patent is extended or adjusted under 35 U.S.C. 154(b) by 993 days.

(21) Appl. No.: 12/325,087

(22) Filed: Nov. 28, 2008

(65) Prior Publication Data
US 2010/0138826 A1 Jun. 3, 2010

(51) Int. Cl.
G06F 9/445 (2006.01)

(52) U.S. Cl.
USPC ........... 717/174; 717/173; 717/177; 717/178; 717/168; 717/170

(58) Field of Classification Search
USPC .................................................. 717/168–178
See application file for complete search history.

(56) References Cited

U.S. PATENT DOCUMENTS

| | | | | |
|---|---|---|---|---|
| 6,266,811 B1 * | 7/2001 | Nabahi | .......................... | 717/174 |
| 6,804,663 B1 * | 10/2004 | Delo | ..................................... | 1/1 |
| 2005/0132350 A1 * | 6/2005 | Markley et al. | ................ | 717/168 |
| 2005/0289538 A1 * | 12/2005 | Black-Ziegelbein et al. | . | 717/177 |
| 2006/0224544 A1 * | 10/2006 | Keith, Jr. | .......................... | 706/60 |
| 2007/0234316 A1 * | 10/2007 | Bayerlein | ...................... | 717/140 |
| 2008/0127084 A1 | 5/2008 | Sattler et al. | | |
| 2008/0163197 A1 | 7/2008 | Rao | | |
| 2008/0163198 A1 | 7/2008 | Rao | | |
| 2009/0144719 A1 * | 6/2009 | Pazdziora | ...................... | 717/171 |

* cited by examiner

*Primary Examiner* — Lewis A Bullock, Jr.
*Assistant Examiner* — Tina Huynh
(74) *Attorney, Agent, or Firm* — Blakely Sokoloff Taylor & Zafman, LLP

(57) ABSTRACT

Methods and apparatuses receive a plurality of files including a software package having code to execute a program on a system with specific attributes, the software package to contain a list identifying specific system attributes required to execute the program. An installation process for the software package is initialized on a system with at least one system attribute that is compatible with the program but not identified by the list of system attributes in the software package, the installation process to identify the system attributes and configured to fail if the system attributes differ from the list in the software package. The installation process identifies an external list of system attributes from the plurality of files separate from the software package wherein the external list of attributes identifies the compatible attribute. The installation process is then executed based on the external list of system attributes.

24 Claims, 5 Drawing Sheets

CHANGABLE DEPLOYMENT CONDITIONS

FIELD

Embodiments of the invention relate to installation of system software, and more particularly to installation of system software based on system attributes.

BACKGROUND

A distributed system, such as a business system, may include a variety of hardware components and software applications installed throughout many layers of the system. For example, the combination of specific hardware components and software applications may allow users to perform business operations (e.g., inventory, sales, personnel, contacts, billing, etc.) within the system.

The installation of new system software requires consideration of the system's hardware components and pre-existing software applications for at least two reasons: to ensure the functionality of the new software to be installed and to ensure that pre-installation functionality of the system is maintained. Thus, system software may need to be based on attributes of a target system, for example, at the design phase.

Information about the target system may be needed to ensure successful installation of the system software. Such information may be characterized as hardware components and pre-existing software applications (i.e., system attributes) that must exist on the target system for the system software to function. Such system attributes essentially describe conditions which must be fulfilled by the target system prior to system software installation. The software to be installed and the additional information required for installation are published together in a single "software package."

Configuring the installation of software for a system is a complex process. The system software installation process must determine if the necessary attributes exist on the system prior to installing the software on the system. Determining that the necessary attributes exist prevents installing system software that will not function properly on a system lacking the necessary attributes. Ensuring the necessary attributes exist on a target system may also confirm that the target system is authorized to have the system software installed.

System attributes may be subject to replacements or upgrades that ultimately have no effect on the functionality of the system software within a software package; however, these "new" system attributes are still distinct from the system attributes listed in the software package. Thus, it is desirable to install the system software despite the fact that the system does not contain all the attributes listed in the software package because the software will still function properly. There may also be an error in the system attributes contained in the software package that is not discovered until after the software package is published. Thus, the software package may not be installable on proper systems (or installable on improper systems). However, once a package is published, it cannot be changed. Thus, a new software package would have to be created with new attributes.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
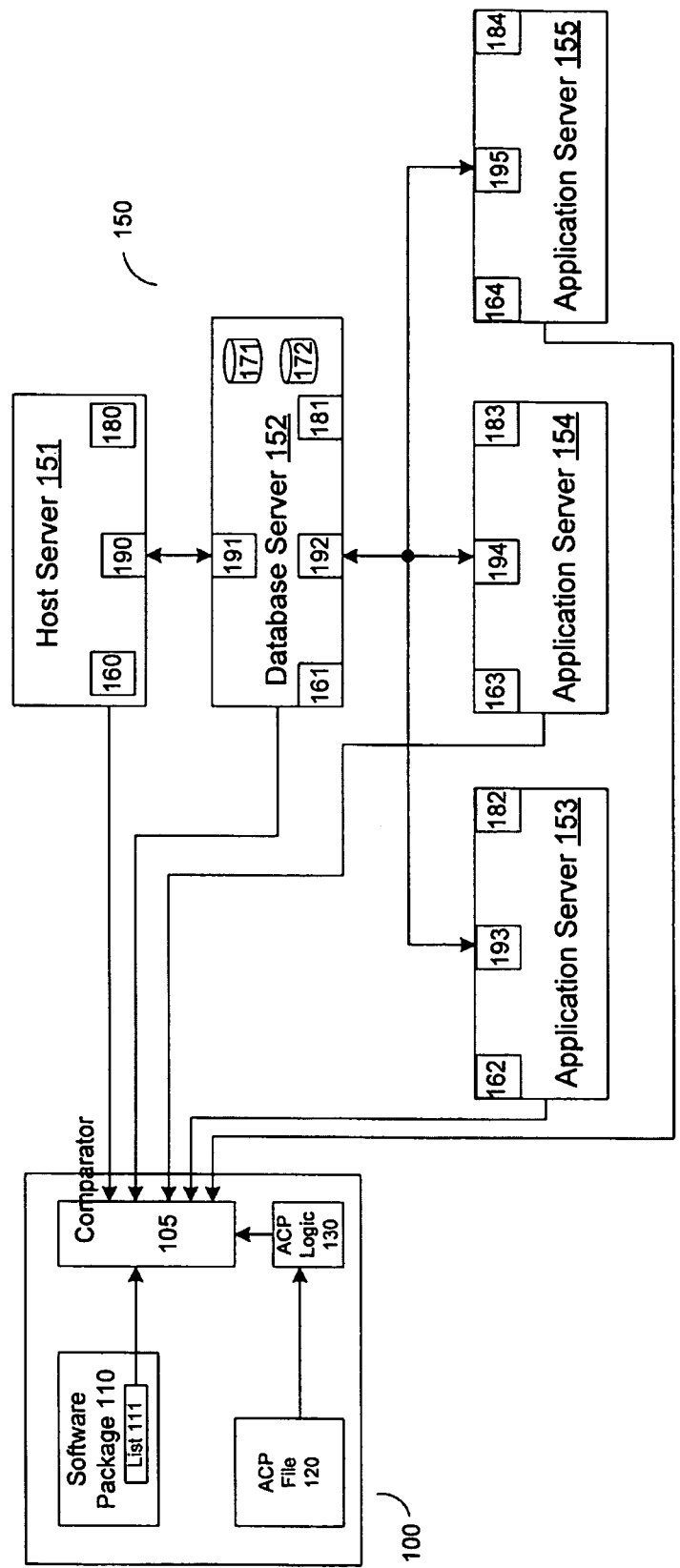
FIG. 1 is a block diagram of an embodiment of a deployment tool used to install a software package on to a system.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the present invention relate to changing the conditions to be fulfilled by a system during system software installation. Embodiments of the present invention may be represented by an installation process (alternatively referred to as a "deployment process").

In one embodiment, the deployment process may identify an external list of system attributes from the plurality of files—i.e., a list of system attributes separate from the list contained in the software package. The external list of attributes identifies compatible attributes as acceptable variations from the list of attributes included in the software package, and allows the installation of the system software contained in the software package on to a system containing the compatible attribute.

As described herein, the deployment process may include receiving a plurality of files including a software package. The software package may contain a program designed to be installed and executed on a system with specific attributes as known in the art. The software package may also contain a list identifying specific system attributes required for installation of the system software as known in the art.

Prior art installation processes would prevent software from being installed on a target system containing a compatible system attribute because the target system attributes have to match the attributes defined in the software package. Furthermore, the attribute check cannot merely be disabled because there may be another attribute conflict that does in fact affect system functionality, and installation of the system software could render the target system unusable.

An example implementation of the external list of attributes may be referred to as an Attributes Change Package (ACP). The reference "ACP" will be used herein. Other labels could alternatively be applied to the external list of attributes. An ACP contains a list of attributes necessary for system software installation or deployment. One distinction of an ACP over software packages known in the art in is that an ACP does not contain any system software.

In one embodiment, an ACP is applicable to multiple software packages. Thus, the ACP may identify its applicable software packages. In another embodiment, an ACP may further include system attributes applicable to other software packages. Such embodiments may allow an ACP to be generated only once, and usable for other software packages. Furthermore, only one generation of an ACP would be necessary if the ACP is to be contained on a machine readable storage medium—the single version of the ACP may be copied from the machine readable storage medium as needed.

A plurality of ACP files may be received and/or used by a deployment tool. In one embodiment, a deployment tool may attempt installation using the plurality of ACP files in a cumulative manner. Each ACP file may further contain version identification information. ACP version identification information may indicate that an ACP file is a replacement or a revision of a previously published ACP file. In one embodiment, a deployment tool may attempt installation using only the most recent version of the ACP file and disregard (or invalidate) other ACP files received.

An installation or deployment tool may compute an attribute list based on the ACP and the list contained in the software package. In one embodiment, a deployment tool may compute an attribute list using only the ACP. In another embodiment, a deployment tool may compute an attribute list using a combination of the ACP and the list contained in the software package. The deployment tool may execute the deployment process based on the computed attribute list. Thus, the deployment process is executed based, at least in part, on the system attributes listed in the ACP. In one embodiment of the invention, the deployment process is based solely on the system attributes of the ACP. In another embodiment, both the ACP and the list of attributes contained in the software package are used in combination during the deployment process, with the attributes in the ACP in effect replacing some attributes in the list contained in the software package. The ACP may also address attributes that should no longer affect the deployment process. For example, the list of attributes contained in the software package may contain an unnecessary hardware component requirement that unduly restricts the types of systems for which the software package may be installed or deployed. Thus, the ACP may identify attributes within the list contained in the software package that the deployment process may ignore.

In another embodiment of the invention, the deployment process may first attempt to install the system software based on the list of attributes contained in the software package. If the installation attempt based on the list of attributes contained in the software package fails, the deployment process may further search the plurality of files for a file containing a list of system attributes that differ from the list in the software package, and then re-execute the deployment process if another list is found.

An ACP may contain an alternative set of attributes acceptable for the execution of the program of the software package. The deployment process may attempt installation using both the ACP and the list of system attributes contained in the software package, and fail if neither list matches the attributes of the target system.

FIG. 1 is a block diagram of an embodiment of a deployment tool used to install a software package on to a system. Deployment tool 100 is used to install software package 110 on to target system 150. Deployment tool 100 may receive a plurality of files, including software package 110 and ACP 120. Software package 110 includes list of system attributes for installation 111. Deployment tool 100 may also contain ACP logic 130 and attribute comparator 105, described further below. In one embodiment, testing tool 100 may contain any machine readable storage medium to store ACP 120. In another embodiment, ACP 120 is stored in any machine readable storage medium contained within target system 150

The plurality of files required by the installation process, including software package 110 and ACP 120, may be received over the internet, together or separately. The installation process may also be a "closed installation," where the plurality of files are received on machine readable storage medium including any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). Thus, the embodiments of the invention may be used on systems that are not connected to the internet.

Target system 150 contains specific system attributes for the system software of software package 110 to install and function properly. In one embodiment, the system contains host server 151, database server 152, and application servers 153, 154 and 155. System attributes include, but are not limited to, the hardware, software and infrastructure attributes of servers 151-155.

Target system 150 may refer to a distributed server based system divided across several layers, e.g., a database layer containing database server 152, an application layer containing application servers 153-155 and a presentation layer provided by host server 151. The hardware of target system 150 may contain hardware components 160-164 that work together to create a system configuration for target system 150. Hardware components 160-164 may comprise hardware servers, disk storage systems, network components (e.g., routers, network switches, security firewalls, etc.), and memory architecture.

The software of target system 150 may be configured for multiprocessor server technology with scalable operating systems and relational databases 170 and 171. System software components 180-184 may include operating system (e.g., Linux, Unix, Windows) software, database management system software (e.g., SQL-based application programs and queries) and other system software applications. Infrastructure components 190-195 may be necessary to support the integration of the various system software and hardware components and may include memory architecture, system bus architecture, and I/O architecture.

Different hardware platforms, in terms of configuration flexibility and on-the-fly adaptability, may be required to support various operating systems and levels of system availability. Thus, attributes of target system 150 may further include attributes related to the size, configuration and scaling capabilities of the system. Such attributes are related to the aforementioned hardware, software and infrastructure components. Thus, the system software of software package 110 may be dependent upon, for example, the number of CPUs within target system 150, the amount of memory available, internal server architecture configurations, support for high-speed disk operations, etc.

The system components listed above are to be understood as an arbitrary amount of components. Embodiments of the invention may be used on systems containing other quantities of the components listed above.

Deployment tool 100 may compute an attribute list based on ACP file 120 and the list of attributes included in the software package 110. In one embodiment, deployment tool 100 may compute an attribute list using only ACP file 120. In another embodiment, deployment tool 100 may compute an attribute list using a combination of ACP file 120 and the list attributes included in the software package 110. Thus, the deployment process is executed based, at least in part, on the system attributes listed in ACP file 120.

In one embodiment, ACP logic 130 identifies ACP file 120, and deployment tool 100 installs software package 110 onto target system 150 based on ACP file 120. In one embodiment, deployment tool 100 verifies the attributes listed in ACP file 120 match the attributes of target system 150 using attributes comparator 105. Attributes listed in the ACP may include any or all of the hardware and software attributes of host server 151, database server, 152, and application servers 153, 154 and 155.

In one embodiment, deployment tool 100 will only base the installation of software package 110 on ACP file 120. In another embodiment, deployment tool 100 will use both ACP file 120 and the list of attributes included in the software package 111, where priority is given to ACP attributes in the case of conflicting attributes. Software package 110 may contain software for any or all of the servers 151-155 of target system 150.

Figure 2:
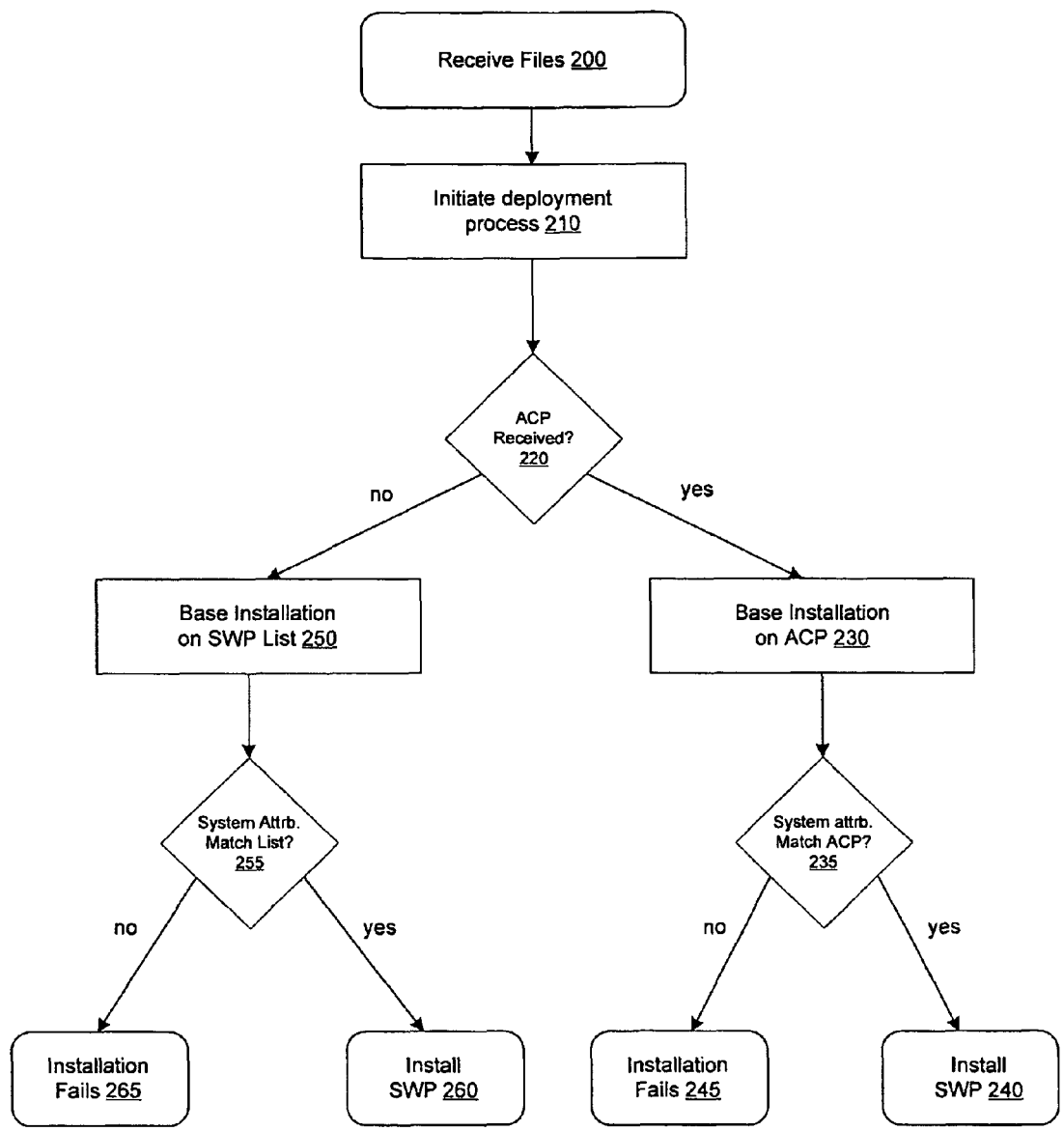
FIG. 2 is a flow diagram of an embodiment of a process for installing a software package based on an Attribute Change Package (ACP).

FIG. 2 is a flow diagram of an embodiment of a process for installing a software package based on an ACP. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

The deployment tool receives a plurality of files including a software package having code to execute a program on a system with specific attributes, 200. The software package also contains a list identifying specific system attributes required to execute and install the program. The plurality of files may include another file separate from the software package. The file separate from the software package contains an ACP—an external list of attributes that identifies attributes compatible with the program but not identified by the list of system attributes in the software package.

A deployment process is initiated for the software package on a target system by a deployment tool, 210. The target system contains the system attributes compatible with the program but not identified by the list of system attributes in the software package.

The deployment process determines if an ACP was received, 220. If it was received, the deployment process is executed based on the ACP, 230. A plurality of ACP files may also be received. In one embodiment, the deployment process is executed based the plurality of ACP files in a cumulative manner. For example, multiple ACP files may be received—an ACP containing entries for software components needed by the system software of a software package, and an ACP containing entries for hardware and system components needed by the system software of a software package. The deployment process may be executed using a combination of the ACP files received.

Each ACP file may further contain version identification information to indicate that the ACP file is a replacement or revision of a previously published ACP file. For example, ACP version identification information may comprise a version number. In one embodiment, the deployment process is executed using only the most recent version of the ACP file—i.e., the ACP file with the highest version number. The deployment process may disregard or invalidate ACP files received with lower version numbers. ACP version identification information may also be used if multiple ACP files are received that, collectively, contain contradictory entries of components needed by the system software of a software package. In one embodiment, the deployment process may still be executed using a combination of the ACP files, wherein attribute definitions of the most recent version of the ACP file—i.e., the ACP file with the highest version number—are used if there exists conflicting attribute entries amongst the plurality of ACP files.

The deployment process based on the ACP includes further determining if the target system contains the attributes listed in the ACP file, 235. If the target system contains the attributes, the software package is installed on the target system by the deployment tool, 240. If the target system does not contain the attributes, the deployment process fails, 245. In one embodiment, the deployment process generates result data detailing the attributes of the target system that caused the installation failure.

If no external list of system attributes is detected, the deployment tool executes the deployment process is executed based on the list of system attributes included in the software package, 250. Deployment process 250 is similar to the process based on the ACP, described above. If the target system contains the attributes required by the software package file, 255, the software package is installed, 260. If not, installation fails, 265.

Figure 3:
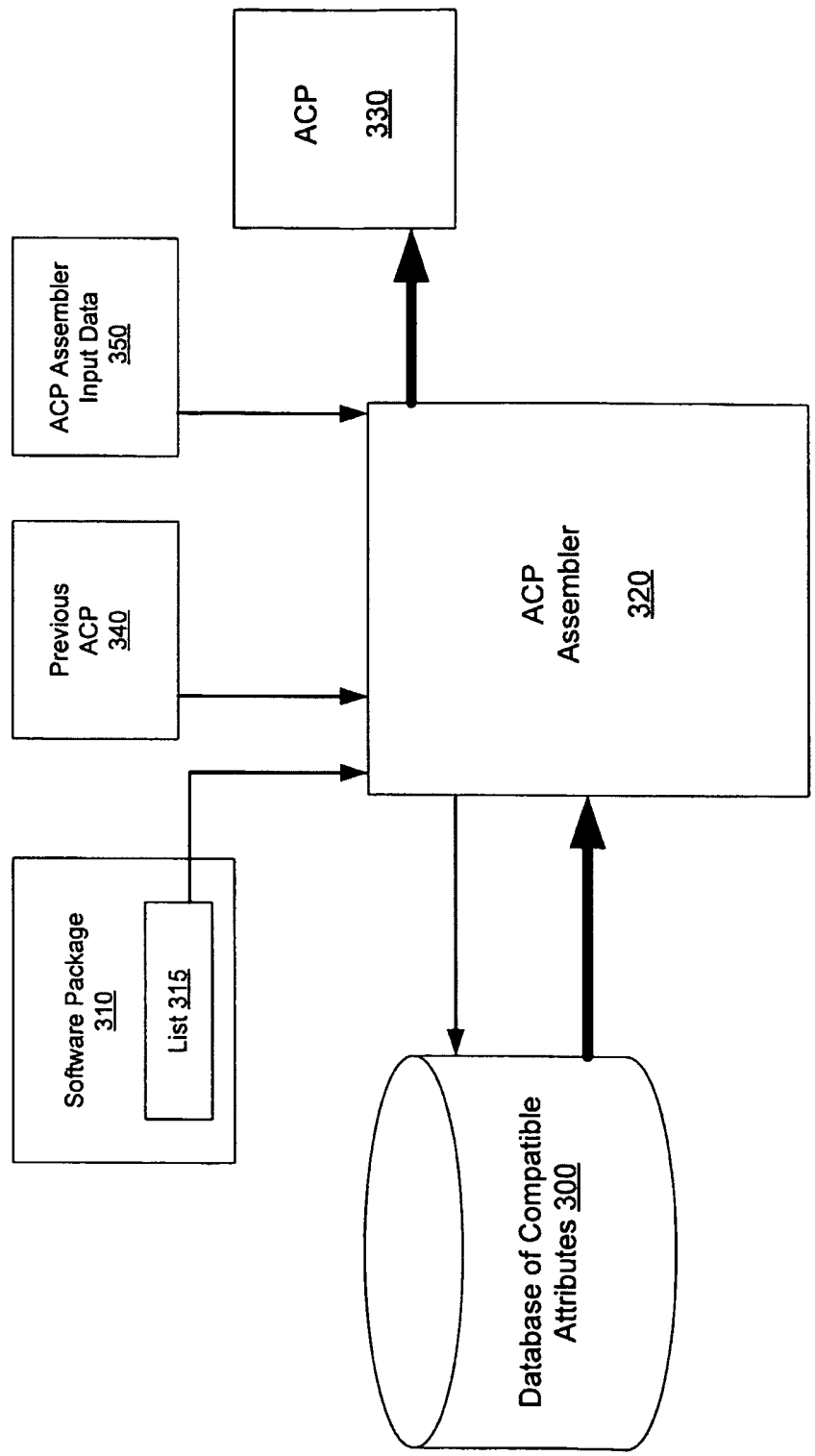
FIG. 3 is a block diagram of an embodiment of a system illustrating an ACP being formed based on the list of attributes necessary for system software installation and functionality.

FIG. 3 is a block diagram of an embodiment of a system illustrating an ACP being formed based on the list of attributes necessary for system software installation and functionality. System hardware components or software applications may be subject to changes subsequent to the publication of a software package. For example, a common hardware component may be defective and unusable for functionality unrelated to the system software of the software package and require replacement in all circumstances. Also, a system software application may be replaced by a different version in order to upgrade performance. Thus, in one embodiment, a deployment process will need to be aware of compatible attributes in order to install the system software of a software package on a target system with at least one system attribute that is compatible with the system software (i.e., the attribute does not affect the system software's functionality) but not identified by the list of system attributes in the software package.

A proprietor of a software package may wish to control the installation of the software package after the package has been published. In one embodiment, a database of compatible system attributes may be stored in database 300. Database of compatible system attributes 300 can be updated as new components or new systems are developed that seek to utilize (or merely co-exist with) software package 310. Software package 310 contains a list of attributes 315 necessary for system software functionality. For example, software package 310 may require a version V of software component C to exist on a target system. After publication of software package 310, software component C may be released as a new version V1, which is compatible but distinct from V—i.e., the system software of software package 310 may be successfully execute on a target system with version V1 of software component C.

Database 300 may contain an entry related to software component C listing the acceptable versions as V and V1. An ACP assembler 320 may assemble and publish ACP 330 based on database 300 and internal list of attributes 315 in software package 310. ACP 330 is generated, for example, to contain the attribute software component C because this attribute is listed in internal list of attributes 315. The acceptable versions of software component C are listed as V and V1, to correspond with database 310. Thus, ACP 330 may be used for successful installation of software package 310 for systems containing versions V and V1 of software component C. In one embodiment, the ACP is created as a different file type/format than a software package.

In one embodiment, ACP assembler 320 requires data describing an attribute and data describing the versions of such attributes that must exist on a target system for software package 310 to successfully execute on the target system in order to create ACP 330. Such data may be provided by database 300. Database 300 may store all known attribute data and version data required by software package 310. ACP assembler 320 may create ACP 330 based on internal list of attributes 315. In one embodiment, ACP assembler 320 will retrieve known versions for each attribute of internal list of attributes 315 and create ACP 330.

In another embodiment, previous ACP 340 is provided to ACP assembler 320. ACP assembler 320 will retrieve known versions for each attribute of previous ACP 340 and create ACP 330. ACP 330 may further contain version information indicating ACP 330 is the most recent version of an ACP for software package 310. For example, ACP 330 may contain a higher version number than previous ACP 340.

ACP assembler 320 may further accept ACP assembler input data 350. In one embodiment, input data 350 identifies a list of attributes for ACP assembler 320 to retrieve the relevant version data from database 300. For example, ACP assembler input data 350 may identify fewer attributes that those listed in internal list of attributes 315. Thus, ACP assembler 320 will create ACP 330 to contain known version data for only a subset of the attributes listed in internal list 315. A deployment tool may then base deployment of software package 310 on both internal list 315 and ACP 330. ACP input data 350 may also indentify specific known versions of an attribute to be contained in ACP 330, rather than all known versions of the attribute.

Input data 350 may also identify attributes or specific versions of attributes no longer required to exist on a target system for software package 310 to successfully execute. For example, a proprietor of a software package may wish to expand the types of machines for which the software package may be deployed. In one embodiment, input data 350 may contain attributes or specific versions of attributes that are contained in internal list 315 that may be omitted in ACP 330. In this embodiment, ACP 330 will have the same attribute and version data as internal list 315, sans the data contained input data 350. A deployment tool may then base deployment of software package on ACP 330 only. Thus, input data 350 may be used to determine whether ACP 330 is created with more, less, and/or different attribute and version data than that contained in internal list 315.

Both ACP 330 and software package 310 may be provided to a deployment tool to deploy software package 310 on to a target system. ACP 330 may be published separately from software package 310. ACP 330 may also be included in subsequent publications of software package 310.

ACP assembler 320 may further receive information regarding the publication status of software package 310. In one embodiment, such information may be passed to ACP assembler 320 via ACP assembler input data 350. In another embodiment, such information is stored in database 300. ACP assembler may be configured to create or publish ACP 330 only if software package 310 has yet to be published. If software package 310 has yet to be published, list 315 may be updated according to the attribute and version data stored in database 300.

Figure 4:
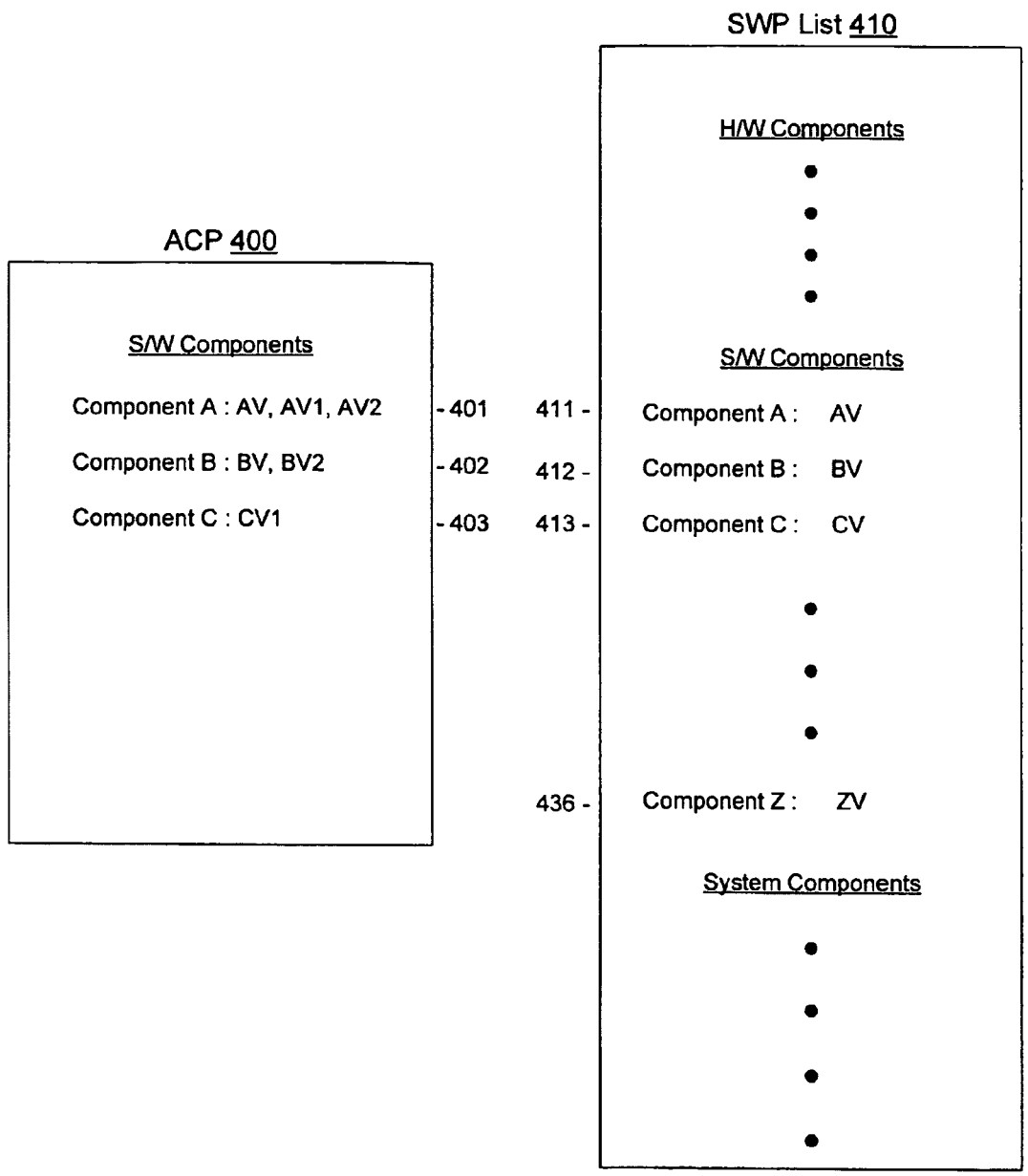
FIG. 4 is block diagram of an embodiment of an ACP designed to supplement and correct the list of system attributes included in a software package.

FIG. 4 is a block diagram of an embodiment of an ACP designed to supplement and correct the list of system attributes included in a software package. The deployment process may be based on both an ACP and the internal list included with the software package. In one embodiment, ACP 400 contains several entries of software components needed by the system software of a software package. The ACP identifies acceptable versions for software components A, B and C in list entries 401, 402 and 403 respectively. Components A-C are to be understood as an arbitrary number of components, and not a limitation of the embodiment. The absence of hardware and system components within the illustration of ACP 400 is to also be understood as an arbitrary illustrative matter. ACP 400 may further contain entries for hardware components and system components.

ACP entry 401 describes software component A as having three acceptable versions—initial version AV, and subsequent versions AV1 and AV2. Versions AV1 and AV2 are compatible in the sense that the software package may execute properly if a system contains any of the above versions. ACP entry 402 describes software component B as having two acceptable versions, BV and BV2. ACP entry 403 informs a deployment tool that software component C has one acceptable version, CV1. As discussed below, version CV1 differs from the version listed in the software package, which lists previous version CV. A possible reason for omitting previous version CV from ACP entry 403 could be that previous version CV is found to be inoperable with the software package after the software package has been published.

The list of system attributes in software package 410 contains hardware, software, and other system attributes necessary for the software package to function properly. List 410 included in the software package contains the necessary (at the time the software package was published) versions of software components A-Z in entries 411 through 436. Components A-Z are to be understood as an arbitrary number of components, and not a limitation of the embodiment. Entry 411 lists the required version of software component A as initial version AV. Entries 412-436 similarly list the required version of the respective software components as the initial versions.

The deployment process may be based on both ACP 400 and software package list 410. In one embodiment, the deployment process uses the ACP entries for attributes listed in both ACP 400 and internal list 410. Thus, ACP entries 401-403 will be used by the deployment process and internal list entries 411-413 will not be used. Entries 401-403 establish that the software package may be installed only for systems containing versions AV, AV1 and AV2 of software component A, versions BV and BV2 of software component B, and version CV1 of software component C, or the deployment process will fail. Because ACP 400 contains no other entries, the deployment process will use internal list 410 to determine if a target system contains the necessary system attributes. Thus, the deployment process will fail if the remaining hardware, software and system components of a target system fail to comply with internal list 410.

Figure 5:
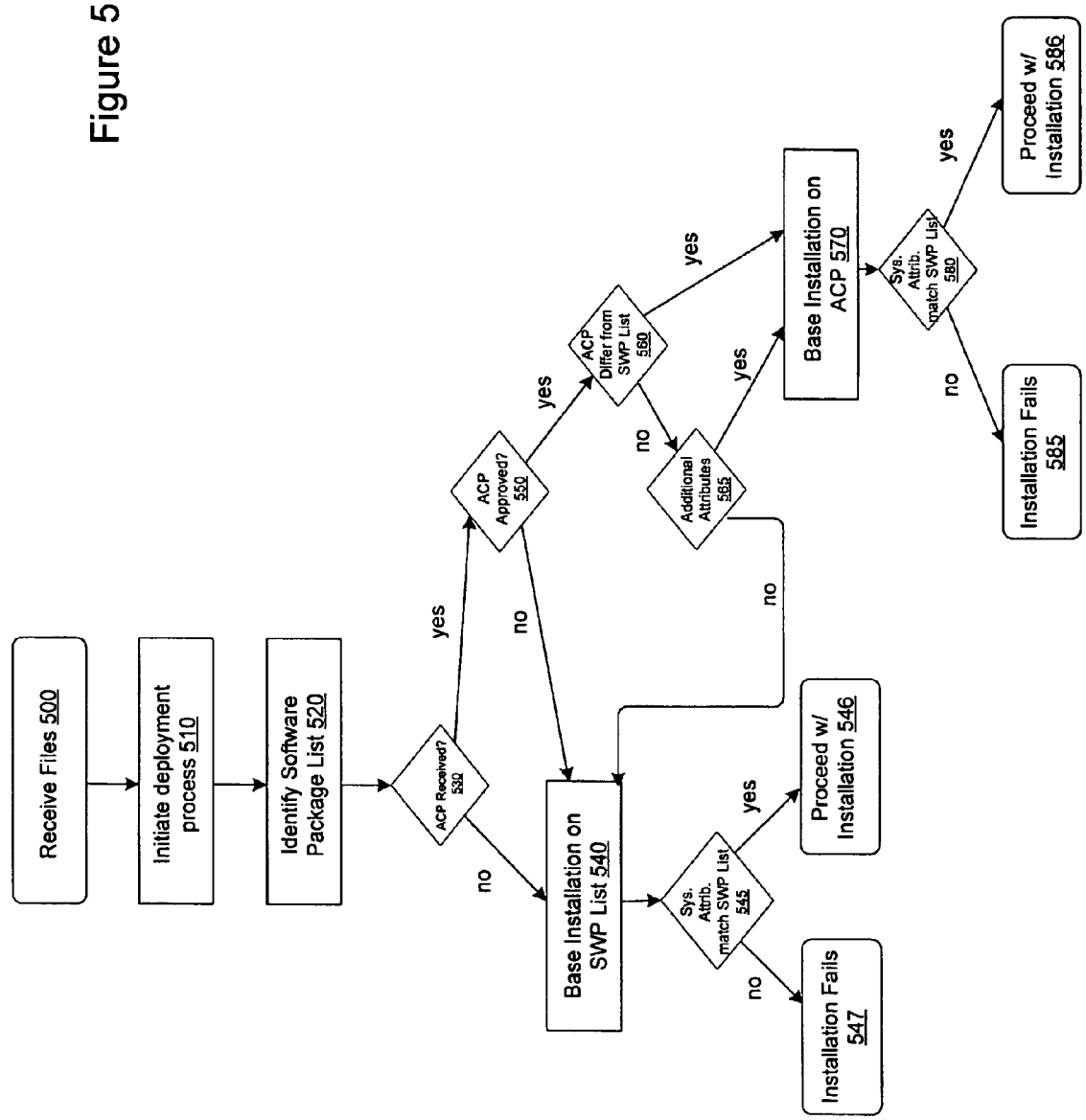
FIG. 5 is a flow diagram of an embodiment of a process for installing a software package based on an ACP.

FIG. 5 is a flow diagram of an embodiment of a process for installing a software package based on an ACP. The deployment tool receives a plurality of files including a software package having code to execute a program on a system with specific attributes, 500. The software package also contains a list identifying specific system attributes required to execute the program. Another file received by the deployment tool separate from the software package may be an ACP that identifies the attributes compatible with the program but not identified by the list of system attributes in the software package.

A deployment process is initiated by a deployment tool to install the system software of the software package on the target system, 510. The target system may contain at least one system attribute that is compatible with the program but is not identified by the list of system attributes in the software package.

The list of specific system attributes contained within the software package is identified during the deployment process by the deployment tool, 520. The deployment tool determines if an ACP was received, 530. If no ACP is detected, the deployment tool executes the deployment process based on the list of system attributes included in the software package, 540.

The deployment process determines if the target system contains the attributes listed in the list of attributes contained in the software package file, 545. If the target system contains the attributes, the software package is installed on the target system, 546. If not, installation fails, 547.

If an ACP is detected by the deployment tool 530, the deployment process determines if the ACP is applicable to the software package, 550.

In one embodiment, the ACP contains system attributes applicable to other software packages. Such attributes may contain additional information to notify the deployment process that such attributes are not to be checked for installation of a software package on a specific type of target system. If there are no different or additional attributes applicable to the software package, 550, the deployment tool executes the installation process based on the list of system attributes included in the software package, 540.

If the ACP is applicable to the software package, the tool determines if the ACP contains different attributes for the same components listed in the list contained in the software package, 560. If there are no different attributes for the same components, then the deployment process determines if the external list contains additional components/attributes, 565. If there are no additional attributes, the deployment tool executes the installation process based on the list of system attributes included in the software package, 540.

If the attributes of the ACP differ from the list of attributes contained in the software package, 560, or if the ACP contains different attributes for the same components listed in the list contained in the software package, 565, the deployment tool executes the installation based on ACP 570. The deployment process determines if the target system contains the attributes listed in the list of attributes contained in the software package file, 580. If it is, the software package is deployed by the deployment tool, 586. If not, installation fails 585.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Various components referred to above as processes, servers, or tools described herein may be a means for performing the functions described. Each component described herein includes software or hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine storage readable medium, which provides content that represents instructions that can be executed. The content may result in a machine performing various functions/operations described herein. A machine readable storage medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable storage medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

The invention claimed is:

1. A method comprising:
receiving a plurality of system software installation files including a software package having an installable program executable on a system with specific system attributes, wherein the software package to contain a list identifying specific system attributes required to execute the installable program and an external list of system attributes separate from the software package;
and wherein the external list to include at least one system attribute that is compatible with the installable program but not identified by the list of system attributes in the software package;
initiating an installation process for the software package on the system with at least one system attribute that is compatible with the installable program but not identified by the list of system attributes in the software package by performing operations including:
detecting the external list of system attributes;
when the external list of system attributes is detected:
determining if the external list of system attributes is applicable to the list of specific system attributes included in the software package;
determining the installation based on the list of specific system attributes contained in the software package if there are no different attributes between the external list of system attributes and the list of specific system attributes contained in the software package, wherein the installation process is configured to fail if the at least one system attribute differs from the list of system using attributes in the software package; and
determining the installation based on the external list of system attributes if the system attributes of the external list differ from the list of specific system attributes contained in the software package, wherein the installation process is configured to fail if the at least one system attribute differs from the list of system attributes in the software package; and
executing the installation process based on the list of specific system attributes contained in the software package if the external list is not detected, wherein the installation process is configured to fail if the at least one system attribute differs from the list of system attributes in the software package.

2. The method of claim 1, wherein determining the installation based on the external list of system attributes comprises using attributes contained in the list in the software package for attributes not contained in the external list.

3. The method of claim 1, wherein the external list contains more attributes than the list included in the software package and wherein the installation process is further configured to fail if the system attributes differ from the additional attributes identified by the external list.

4. The method of claim 1, wherein determining the installation based on the external list of system attributes comprises replacing the list of attributes included in the software package with the external list.

5. The method of claim 1, wherein the external list is applicable to other software packages and further includes system attributes applicable to other software packages.

6. The method of claim 1, wherein the plurality of system software installation files further comprises a plurality of external lists and wherein determining the installation based on the external list of system attributes comprises using a most recent version of the external list.

7. The method of claim 6, wherein each of the plurality of external lists includes a version number, and wherein determining the installation based on the external list of system attributes comprises using only the external list that includes the highest version number.

8. The method of claim 1, wherein the plurality of system software installation files further comprises a plurality of external lists and wherein determining the installation based on the external list of system attributes comprises using the plurality of external lists collectively.

9. A system comprising:
a processor;
a plurality of identifiable specific system attributes comprising hardware, software and infrastructure attributes;
a plurality of system software installation files, including a software package having an installable program executable on the system, the software package to contain a list identifying specific system attributes required to execute the installable program, the list to include at least one system attribute that is compatible but not contained in the system;
an external list of system attributes separate from the software package that identifies the at least one compatible attribute of the system; and
an installation tool configured to receive the software package and the external list, to initiate an installation process for the software package on the system with at least one system attribute that is compatible with the installable program but not identified by the list of system attributes in the software package by performing operations including:
detecting the external list of system attributes;
when the external list of system attributes is detected:
determining if the external list of system attributes is applicable to the list of
specific system attributes included in the software package;
determining the installation based on the list of specific system attributes contained in the software package if there are no different attributes between the external list of system attributes and the list of specific system attributes contained in the software package, wherein the installation process is configured to fail if the at least one system attribute differs from the list of system attributes in the software package; and
determining the installation based on the external list of system attributes if the system attributes of the external list differ from the list of specific system attributes contained in the software package, wherein the installation process is configured to fail if the at least one system attribute differs from the list of system attributes in the software package, and to execute an installation process based on the list of specific system attributes contained in the software package if the external list is not detected, wherein the installation is configured to fail if the at least one system attribute differs from the list of system attributes in the software package.

10. The system of claim 9, wherein determining the installation based on the external list of system attributes comprises compares the system's attributes with the list in the software package for attributes not contained in the external list.

11. The system of claim 9, wherein the external list contains more attributes than the list included in the software package, and wherein the installation process is further configured to fail if the system attributes differ from the additional attributes identified by the external list.

12. The system of claim 9, wherein determining the installation based on the external list of system attributes comprises replacing the list of attributes included in the software package with the external list.

13. The system of claim 9, wherein the external list is applicable to other software packages and further includes system attributes applicable to other software packages.

14. The system of claim 9, further comprising a plurality of external lists, wherein determining the installation based on the external list of system attributes is based on a most recent version of the external list received by the installation tool.

15. The system of claim 14, wherein each of the plurality of external lists includes a version number, and wherein determining the installation based on the external list of system attributes is based on only the external list that includes the highest version number.

16. The system of claim 9, further comprising a plurality of external lists, wherein determining the installation based on the external list of system attributes is based on all of the plurality of external lists.

17. An article of manufacture comprising a non-transitory machine readable storage medium having content stored thereon to provide instructions to cause a machine to perform operations including:
receiving a plurality of system software installation files including a software package having an installable program executable on a system with specific system attributes, wherein the software package to contain a list identifying specific system attributes required to execute the installable program and an external list of system attributes separate from the software package and wherein the external list to include at least one system attribute that is compatible with the installable program but not identified by the list of system attributes in the software package;
initiating an installation process for the software package on the system with at least one system attribute that is compatible with the installable program but not identified by the list of system attributes in the software package by performing operations including:
detecting the external list of system attributes;
when the external list of system attributes is detected:

determining if the external list of system attributes is applicable to the list of specific system attributes included in the software package;

determining the installation based on the list of specific system attributes contained in the software package if there are no different attributes between the external list of system attributes and the list of specific system attributes contained in the software package, wherein the installation process is configured to fail if the at least one system attribute differs from the list of system attributes in the software package; and determining the installation based on the external list of system attributes if the system attributes of the external list differ from the list of specific system attributes contained in the software package, wherein the installation process is configured to fail if the at least one system attribute differs from the list of system attributes in the software package; and executing the installation process based on the list of specific system attributes contained in the software package if the external list is not detected, wherein the installation process is configured to fail if the at least one system attribute differs from the list of system attributes in the software package.

18. The article of manufacture of claim 17, wherein determining the installation based on the external list of system attributes comprises using attributes contained in the list in the software package for attributes not contained in the external list.

19. The article of manufacture of claim 17, wherein the external list contains more attributes than the list included in the software package and wherein the installation process is further configured to fail if the system attributes differ from the additional attributes identified by the external list.

20. The article of manufacture of claim 17, wherein determining the installation based on the external list of system attributes comprises replacing the list of attributes included in the software package with the external list.

21. The article of manufacture of claim 17, wherein the external list is applicable to other software packages and further includes system attributes applicable to other software packages.

22. The article of manufacture of claim 17, wherein the plurality of system software installation files further comprises a plurality of external lists and wherein determining the installation based on the external list of system attributes comprises using a most recent version of the external list.

23. The article of manufacture of claim 22, wherein each of the plurality of external lists includes a version number, and wherein determining the installation based on the external list of system attributes comprises using only the external list that includes the highest version number.

24. The article of manufacture of claim 17, wherein the plurality of system software installation files further comprises a plurality of external lists and wherein determining the installation based on the external list of system attributes comprises using the plurality of external lists collectively.

* * * * *